(12) United States Patent
Abdel-Messeh et al.

(10) Patent No.: US 8,105,030 B2
(45) Date of Patent: Jan. 31, 2012

(54) COOLED AIRFOILS AND GAS TURBINE ENGINE SYSTEMS INVOLVING SUCH AIRFOILS

(75) Inventors: William Abdel-Messeh, Middletown, CT (US); Michael F. Blair, Manchester, CT (US); Atul Kohli, Tolland, CT (US); Justin D. Piggush, Hartford, CT (US)

(73) Assignee: United Technologies Corporation, Hartford, CT (US)

(*) Notice: Subject to any disclaimer, the term of this patent is extended or adjusted under 35 U.S.C. 154(b) by 816 days.

(21) Appl. No.: 12/191,572

(22) Filed: Aug. 14, 2008

(65) Prior Publication Data

US 2010/0040478 A1 Feb. 18, 2010

(51) Int. Cl.
 F01D 5/08 (2006.01)
 F01D 5/18 (2006.01)
 F01D 5/14 (2006.01)
 F04D 29/58 (2006.01)

(52) U.S. Cl. ........ 416/95; 416/231 R; 416/232; 415/115

(58) Field of Classification Search .................. None
 See application file for complete search history.

(56) References Cited

U.S. PATENT DOCUMENTS

| | | | |
|---|---|---|---|
| 5,374,162 A | 12/1994 | Green | |
| 5,419,681 A | 5/1995 | Lee | |
| 5,458,461 A | 10/1995 | Lee et al. | |
| 5,486,093 A | 1/1996 | Auxier et al. | |
| 5,498,133 A | 3/1996 | Lee | |
| 5,690,473 A * | 11/1997 | Kercher | 416/97 A |
| 5,779,437 A * | 7/1998 | Abdel-Messeh et al. | 415/115 |
| 6,050,777 A | 4/2000 | Tabbita et al. | |
| 6,099,251 A | 8/2000 | LaFleur | |
| 6,139,258 A | 10/2000 | Lang, III et al. | |
| 6,164,912 A | 12/2000 | Tabbita et al. | |
| 6,183,199 B1 | 2/2001 | Beeck et al. | |
| 6,210,112 B1 | 4/2001 | Tabbita et al. | |
| 6,234,755 B1 | 5/2001 | Bunker et al. | |
| 6,955,522 B2 | 10/2005 | Cunha et al. | |
| 6,994,521 B2 | 2/2006 | Liang | |
| 7,246,992 B2 | 7/2007 | Lee | |
| 7,300,252 B2 | 11/2007 | Liang | |
| 7,540,712 B1 * | 6/2009 | Liang | 416/1 |
| 7,556,476 B1 * | 7/2009 | Liang | 416/97 R |
| 7,690,893 B2 * | 4/2010 | Cunha | 416/97 R |
| 2005/0265838 A1 | 12/2005 | Liang | |
| 2009/0047136 A1 * | 2/2009 | Chon et al. | 416/97 R |

FOREIGN PATENT DOCUMENTS

EP 0924382 6/1999

* cited by examiner

*Primary Examiner* — Scott B Geyer
(74) *Attorney, Agent, or Firm* — Carlson, Gaskey & Olds, P.C.

(57) ABSTRACT

Cooled airfoils and gas turbine engine systems involving such airfoils are provided. In this regard, a representative cooled airfoil includes: an exterior surface defining a leading edge, a trailing edge, a suction side and a pressure side; an interior surface defining an interior cavity; trenches in the exterior surface oriented spanwise along the leading edge; and cooling holes communicating between the interior cavity and the trenches such that cooling air provided to the interior cavity flows from the interior cavity though the cooling holes into the trenches, the cooling holes having exterior apertures located in the trenches and interior apertures located at the interior surface.

20 Claims, 6 Drawing Sheets

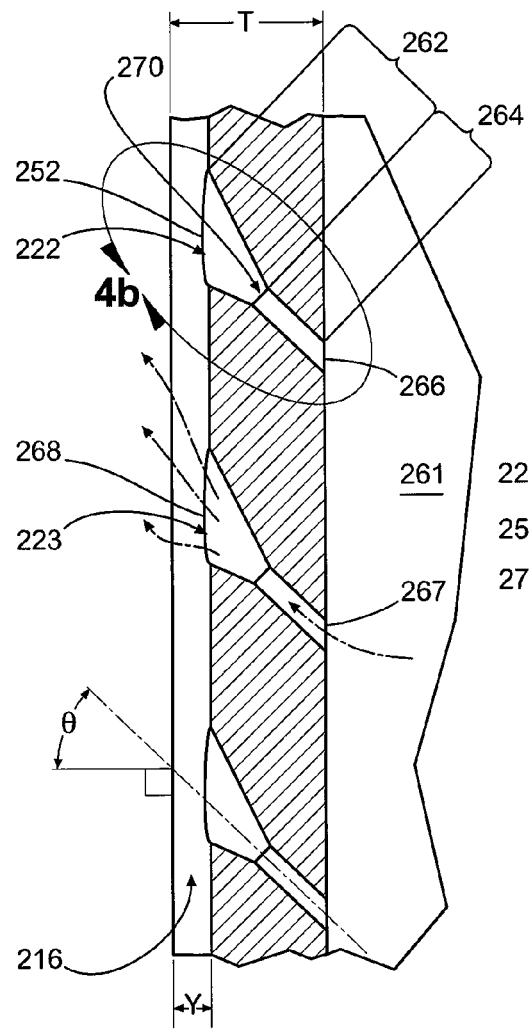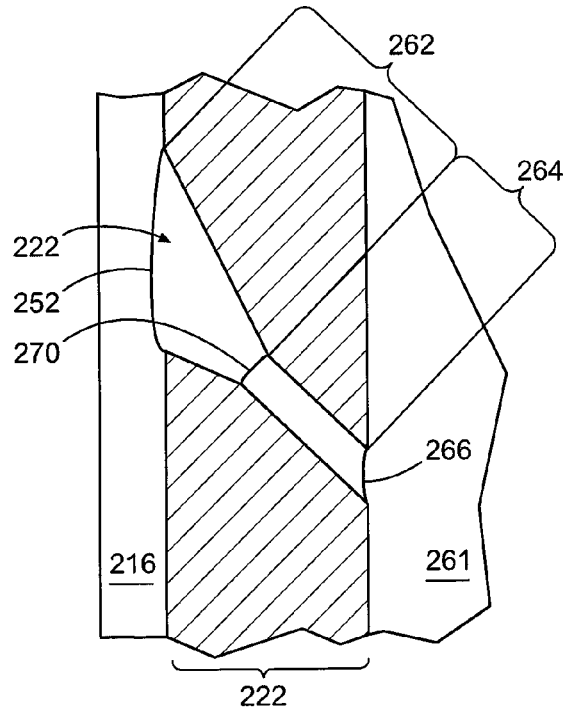
FIG. 4a  FIG. 4b

COOLED AIRFOILS AND GAS TURBINE ENGINE SYSTEMS INVOLVING SUCH AIRFOILS

BACKGROUND

1. Technical Field

The disclosure generally relates to gas turbine engines, more specifically to airfoils.

2. Description of the Related Art

Gas turbine engines produce hot combustion gases that impinge turbine airfoils. In this regard, cooling air oftentimes is provided through cooling holes located on the leading edges of airfoils. The cooling air serves as a medium for heat transfer and can establish films of cooling air along the surfaces of the airfoil.

SUMMARY

Cooled airfoils and gas turbine engine systems involving such airfoils are provided. In this regard, an exemplary embodiment of an airfoil comprises: an exterior surface defining a leading edge, a trailing edge, a suction side and a pressure side; an interior surface defining an interior cavity; trenches in the exterior surface oriented spanwise along the leading edge; and cooling holes communicating between the interior cavity and the trenches such that cooling air provided to the interior cavity flows from the interior cavity through the cooling holes into the trenches, the cooling holes having exterior apertures located in the trenches and interior apertures located at the interior surface.

An exemplary embodiment of a turbine assembly for a gas turbine engine comprises: multiple airfoils, a first of the airfoils having an exterior surface, an interior cavity, trenches and cooling holes; the exterior surface defining a leading edge, a trailing edge, a suction side and a pressure side; the trenches being located in the exterior surface and oriented along the leading edge; the cooling holes communicating between the interior cavity and the trenches such that cooling air provided to the interior cavity flows from the interior cavity through the cooling holes into the trenches, the cooling holes having exterior apertures located in the trenches.

An exemplary embodiment of a gas turbine engine comprises: a compressor section; a combustion section; and a turbine section; the turbine section having multiple airfoils, a first of the airfoils having an exterior surface, an interior cavity, trenches and cooling holes; the exterior surface defining a leading edge, a trailing edge, a suction side and a pressure side; the trenches being located in the exterior surface and oriented along the leading edge; the cooling holes communicating between the interior cavity and the trenches such that cooling air provided to the interior cavity flows from the interior cavity through the cooling holes into the trenches, the cooling holes having exterior apertures located in the trenches.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

FIG. 4a is a partial section view of the airfoil of FIG. 3 taken along section line 4-4.

FIG. 4b is a detail section view of a cooling hole of FIG. 4a.

FIG. 5b is a detail section view of a trench of FIG. 5a.

DETAILED DESCRIPTION

Cooled airfoils and gas turbine engine systems involving such airfoils are provided, several exemplary embodiments of which will be described in detail. In some embodiments, multiple cooling trenches are oriented along the leading edge of an airfoil. For instance, one of the trenches can be oriented along the stagnation line of the airfoil, while at least one other of the trenches is spaced from the stagnation line. Cooling holes provide flows of cooling air to the trenches, which, in turn, provide flows of cooling air for cooling the exterior of the airfoil. As used herein, a "stagnation line" refers to a spanwise series of locations along the leading edge of an airfoil at which an oncoming stream of air divides into two separate streams, one of which flows over the pressure side and the other of which flows over the suction side of the airfoil.

Figure 1:
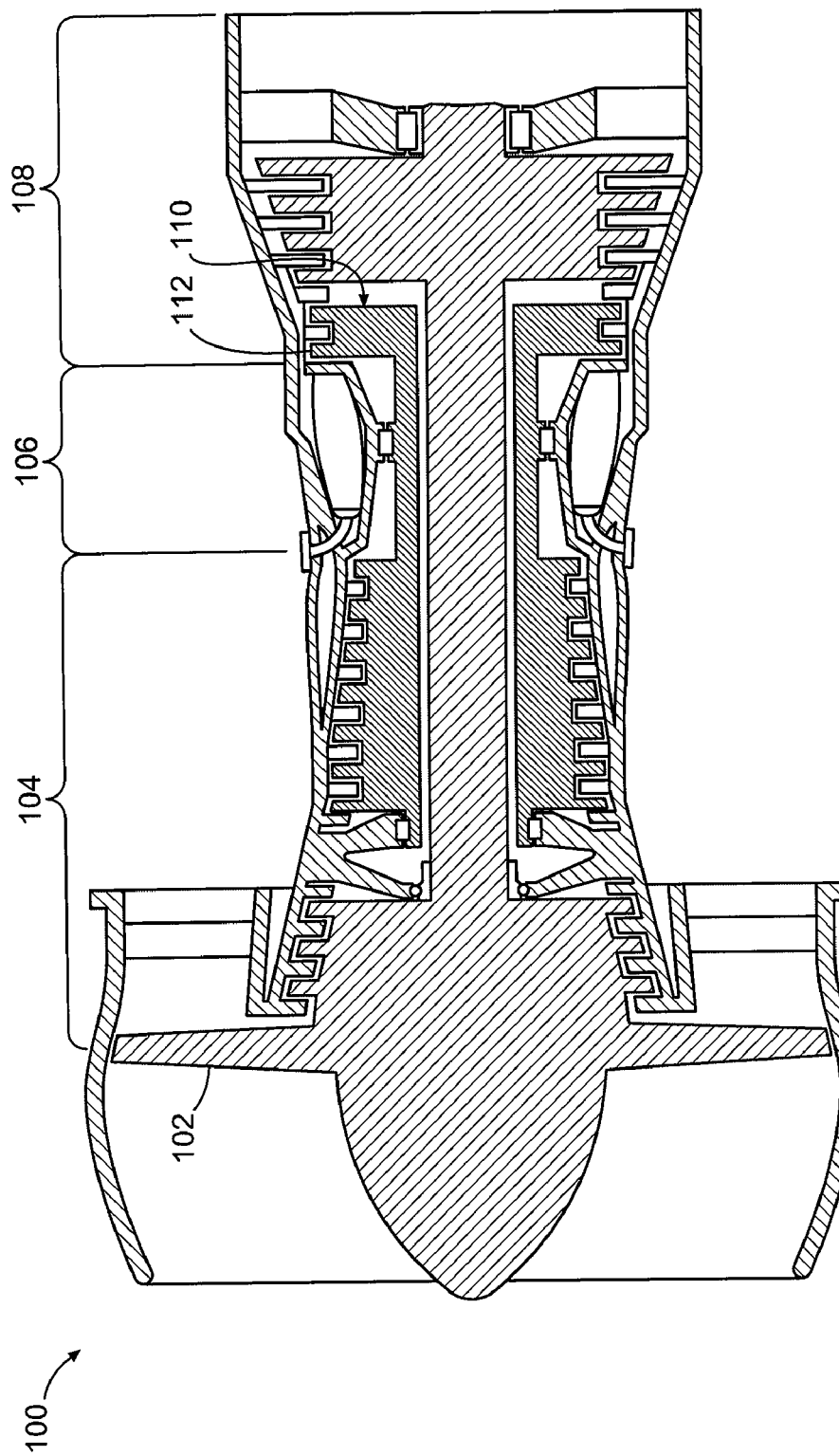
FIG. 1 is a schematic diagram depicting and exemplary embodiment of a gas turbine engine.

In this regard, reference is made to the schematic diagram of FIG. 1, which depicts an exemplary embodiment of a gas turbine engine. As shown in FIG. 1, engine 100 is depicted as a turbofan that incorporates a fan 102, a compressor section 104, a combustion section 106 and a turbine section 108. Notably, turbine section 108 includes a high pressure turbine 110 that incorporates multiple blades (e.g., blade 112). Although the embodiment of FIG. 1 is configured as a turbofan gas turbine engine, it should be understood that the concepts described herein are not limited to use with turbofans as the teachings may be applied to other types of gas turbine engines, including, but not limited to, turbojets, turboshafts and industrial power turbines. Additionally, although the concept is described herein in association with a representative blade, the concepts described herein are not limited to use with blades as the teachings may be applied to other airfoils, such as vanes.

Figure 2:
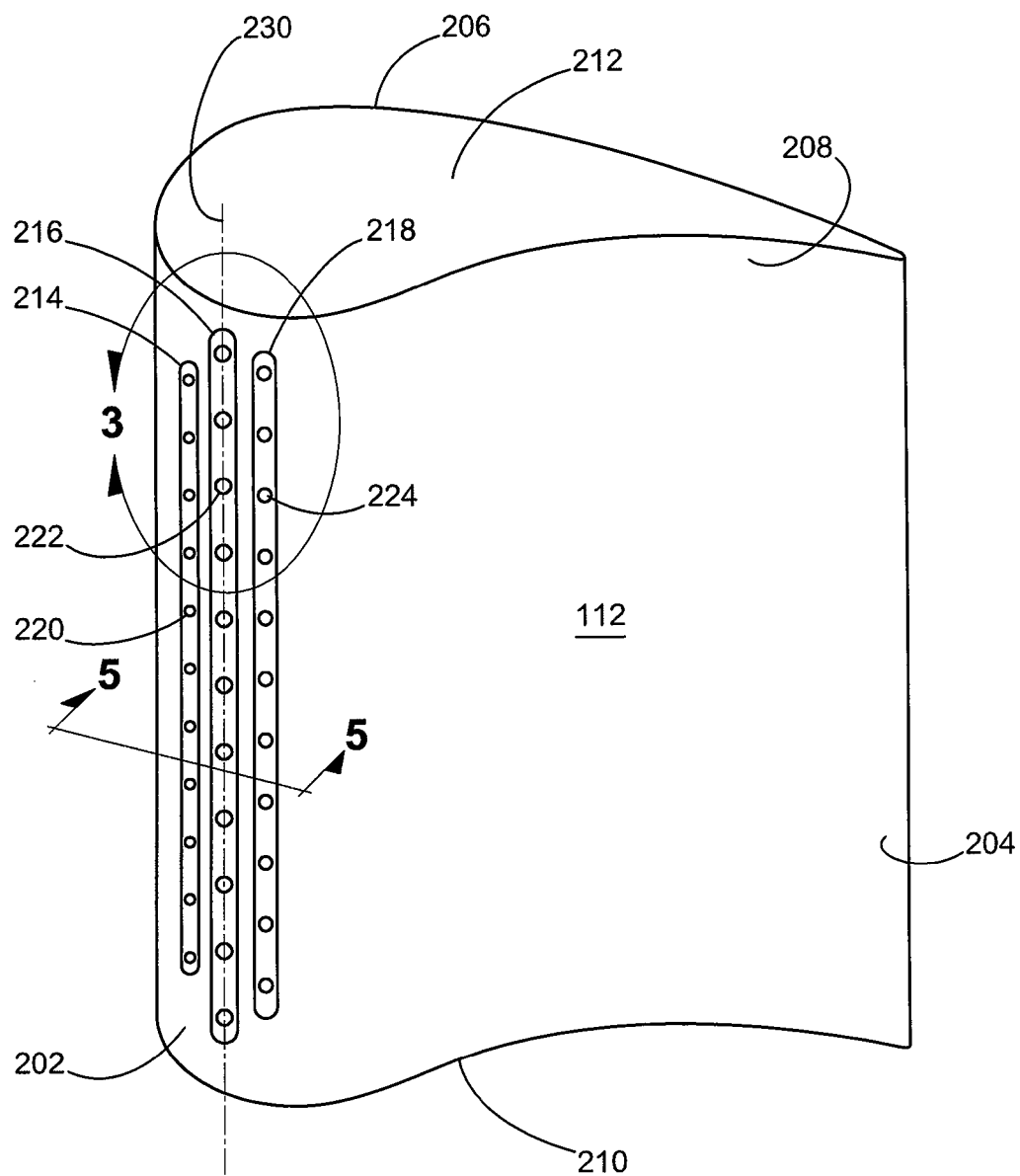
FIG. 2 is a perspective view depicting a representative turbine blade from the embodiment of FIG. 1.

FIG. 2 is a perspective diagram depicting a representative airfoil of the embodiment of FIG. 1. In particular, FIG. 2 depicts blade 112 of the high pressure turbine 110. Blade 112 includes a leading edge 202, a trailing edge 204, a suction side 206, a pressure side 208, a root 210 and a tip 212. Multiple trenches are orientated spanwise along the leading edge. In this embodiment, three such trenches (i.e., trenches 214, 216, 218) are depicted, in other embodiments two or more trenches may be provided. As used herein, the term "trench" refers to a surface depression in which cooling holes are positioned, with the surface depression extending continuously along at least 50% of the span of an airfoil.

Cooling holes (e.g., cooling holes 220, 222 and 224) located in the trenches provide flows of cooling air to the trenches during operation. In this embodiment, cooling air provided to the trenches by the cooling holes permits the trenches to provide films of cooling air that thermally protect the pressure side and suction side of blade 112.

Figure 3:
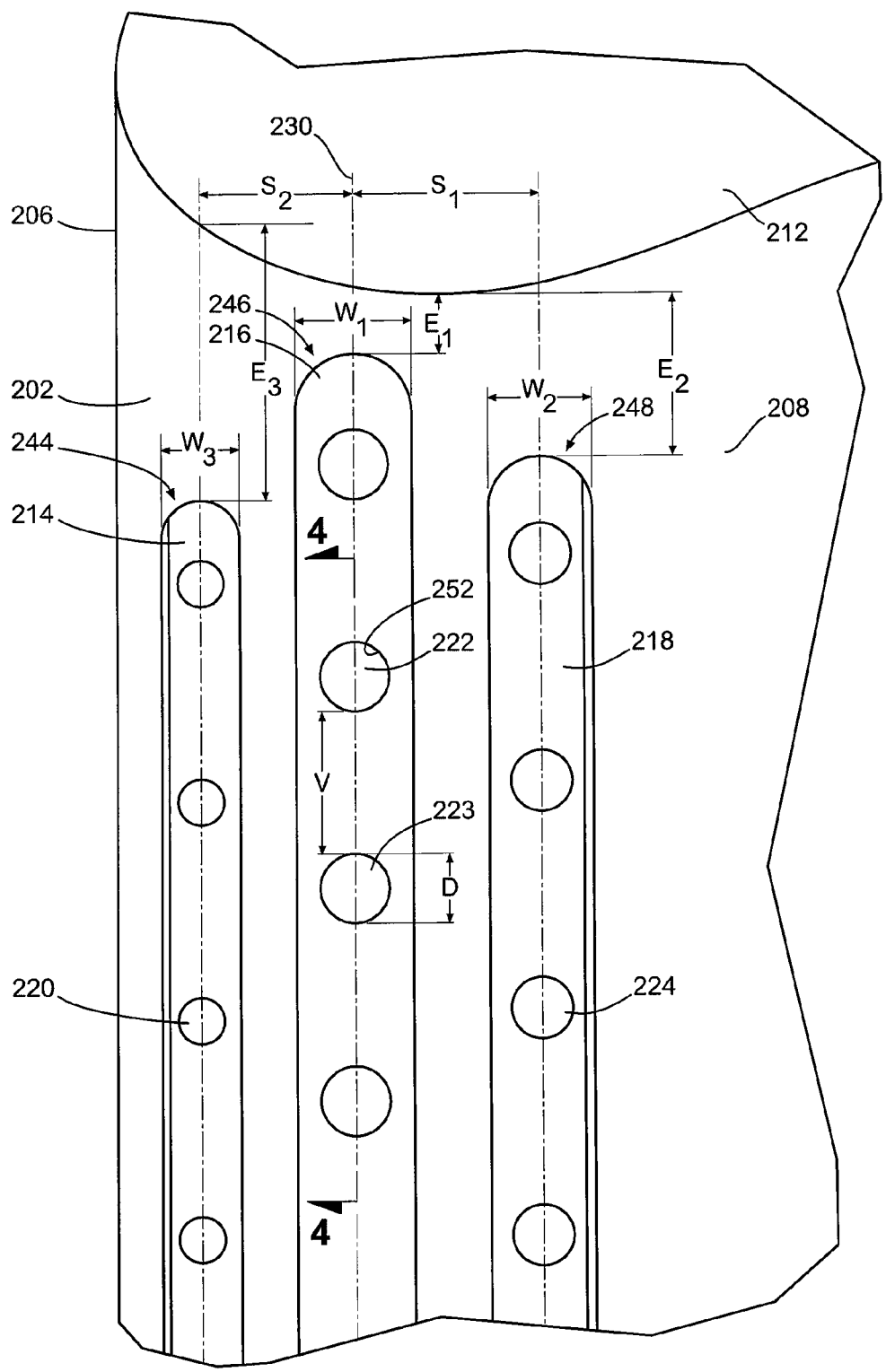
FIG. 3 is a partial view of FIG. 2 illustrating the arrangement of trenches and cooling holes in the turbine blade.

Referring now to FIG. 3, which partially depicts blade 112, trench position is more easily discernable. Specifically, trench 216 (also referred to as a "stagnation trench") extends along stagnation line 230, which corresponds to a stagnation line associated with the highest heat load of the blade during normal operating conditions. In this embodiment, the centerline of stagnation trench 216 is aligned with stagnation line 230. Notably, the width W1 of the stagnation trench 216 is wide enough such that all stagnation lines fall within the width of the stagnation trench under all normal operating conditions. In other embodiments, W1 is preferably between approximately one exterior aperture diameter and approximately three exterior aperture diameters, and more preferably between approximately one exterior aperture diameter and approximately two exterior aperture diameters.

Pressure trench 218 is displaced from stagnation line 230 by distance S1 toward the pressure side 208 of the airfoil. Hence, trench 218 is a "pressure trench". Similarly, trench 214 is displaced from stagnation line 230 toward the suction side 206 of the airfoil. Hence, trench 214 is a "suction trench".

Stagnation trench 216 extends spanwise along the leading edge of blade 112. In this, end 246 of stagnation trench 216 is located a distance of E1 from the tip 212 of the blade. Distance E1 is between approximately 75% and approximately 100% of the span of an airfoil, preferably between approximately 95% and approximately 100% of the span of an airfoil. Distance E2, which corresponds to the distance between end 248 of pressure trench 218 is between approximately 75% and approximately 100% of the span of an airfoil, preferably between approximately 95% and approximately 100% of the span of an airfoil. Distance E3, which corresponds to the distance between end 244 of suction trench 214 is between approximately 75% and approximately 100% of the span of an airfoil, preferably between approximately 95% and approximately 100% of the span of an airfoil. Notably, the end-to-tip spacing of the trenches can be uniform in some embodiments. Similarly, end-to-root spacing (not shown in FIG. 3) of the trenches can be provided in various configurations as well.

Pressure trench 218 is displaced from stagnation line 230 by distance S1. It should be noted that the positioning of trenches on an airfoil can vary depending on the configuration of the airfoil. In one embodiment, for example, a first stage vane, distance S1 (measured from the stagnation line 230 to the centerline of the pressure trench) is preferably less than approximately 15 exit aperture diameters. In another embodiment, for example, airfoils other than first stage vanes, distance S1 is preferably less than approximately 6 exit aperture diameters. Pressure trench 218 exhibits a width W2. Width W2 varies in this embodiment from width W1 and is preferably between approximately one exterior aperture diameter and approximately three exterior aperture diameters, and more preferably between approximately one exterior aperture diameter and approximately two exterior aperture diameters. Notably, although pressure trench 218 and stagnation trench 216 are generally parallel to each other in the embodiment of FIG. 3, in other embodiments the relative orientations of the trenches and spacing between the trenches may vary.

Suction trench 214 is displaced from stagnation line 203 by distance S2. In one embodiment, for example, a first stage vane, distance S2 (measured from the stagnation line to the centerline of the pressure trench) is preferably less than 15 exit aperture diameters. In another embodiment, for example, airfoils other than first stage vanes, distance S2 is preferably less than 6 exit aperture diameters. Suction trench 214 exhibits a width W3. Width W3 varies in this embodiment from width W1 and is preferably between approximately one exterior aperture diameter and approximately three exterior aperture diameters, and more preferably between approximately one exterior aperture diameter and approximately two exterior aperture diameters. Notably, although suction trench 214 and stagnation trench 216 are generally parallel to each other in the embodiment of FIG. 3, in other embodiments the relative orientations of the trenches and spacing between the trenches may vary.

Cooling air holes (e.g. cooling hole 222) include exterior apertures (e.g., exterior aperture 252) positioned within the trenches. In this embodiment, the exterior apertures of the cooling holes are circular and uniform in size, exhibiting diameters D of between approximately 0.01 inches (0.254 mm) and approximately 0.10 inches (2.54 mm). The exterior apertures are also uniformly spaced from adjacent exterior apertures located within the same trench. This spacing (V) is a function of exterior aperture diameter and is between approximately five and twelve exterior aperture diameter, preferably between approximately seven and approximately nine exterior aperture diameters. Notably, in other embodiments, various other sizes, shapes, orientations and/or spacing of cooling holes (within and between trenches) can be used. In particular, other embodiments may include cooling holes with exterior apertures of other shapes, including but not limited to, slot shaped exterior apertures and the apertures may be located in the trench sidewall (e.g. sidewall 286, FIG. 5b) rather than the bottom of the trench as depicted in FIG. 5a.

Referring now to FIGS. 4a and 4b, a partial sectional view of FIG. 3 taken along line 4-4, and a detail view of a trench, respectively, each of the cooling holes associated with stagnation trench 216 extends between an interior aperture (e.g., aperture 266) located adjacent to an interior cavity 261 and a corresponding exterior aperture (e.g., aperture 252) communicating with trench 216. Additionally, as depicted in greater detail in FIG. 4b, each of the cooling holes exhibits two distinct cross-sectional areas. By way of example, cooling hole 222 includes an exterior portion 262 and an interior portion 264. Exterior portion 262 is defined at one end by exterior aperture 252 and at the other end by transition aperture 270. Interior portion 264 is defined at one end by transition aperture 270 and at the other end by interior aperture 266. Notably, exterior portion 262 is conical in shape, whereas interior portion 264 is cylindrical in shape. Note also that the cooling holes are inclined with respect to a local normal of the exterior surface of the airfoil. In some embodiments, the angle of inclination ($\theta$) from the local normal can be between approximately 15° and approximately 45°, preferably between approximately 20° and approximately 30°. Although the cooling holes in FIGS. 4a and 4b are depicted as having two sections, one cylindrical and one conical, in other embodiments the cooling holes may have more or less than two sections and may have at least one section with a shape other than or including cylindrical and conical.

In operation, cooling air provided to the interior cavity 261 is routed by the cooling holes to a corresponding trench. Thus, in FIG. 4a, some of the cooling air (depicted by the arrows) exits interior cavity 261 through interior aperture 267 of cooling hole 223, then enters trench 216 through exterior aperture 268.

Figure 5A:
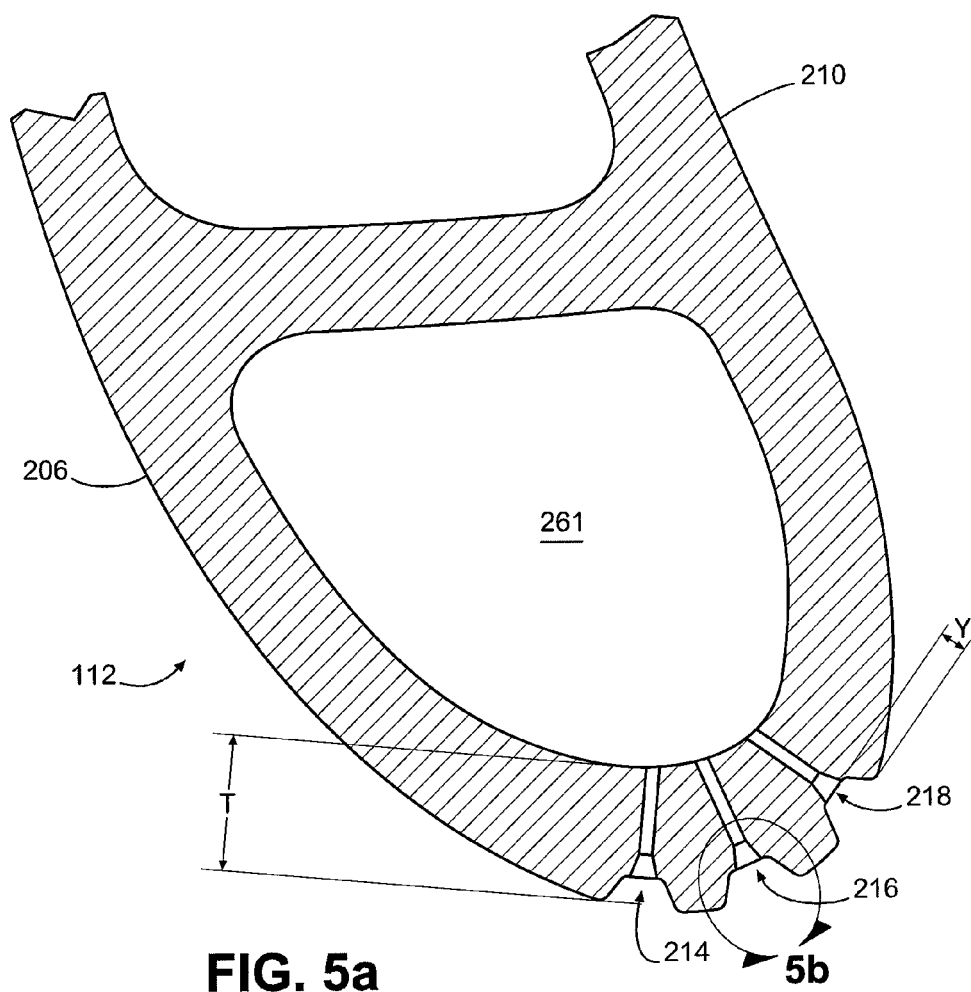
FIG. 5a is a partial section view of the airfoil of FIG. 2 taken along section line 5-5.
Figure 5B:
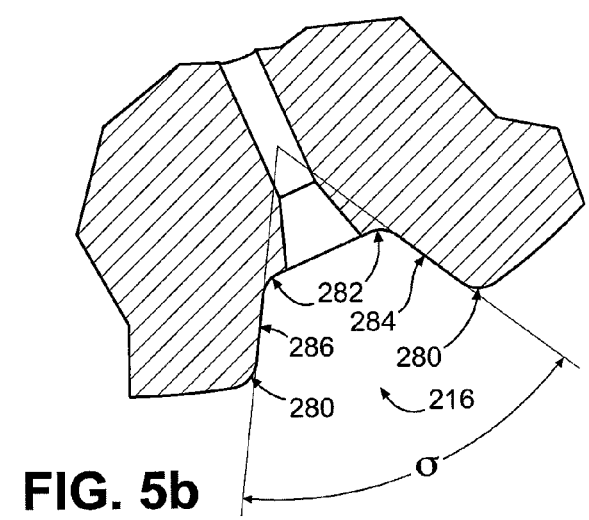

Referring now to FIGS. 5a and 5b, which depicts a partial sectional view of the blade of FIG. 2 and a detail view of a trench of FIG. 2, respectively, the thickness of the wall between the interior cavity 261 and the exterior surface in FIG. 5a is labeled T. The thickness, T, is preferably between approximately three and approximately seven exterior aperture diameters, and more preferably between approximately four and approximately five exterior aperture diameters. Although T is depicted as the wall thickness near a suction side trench it should be understood that T may represent the wall thickness near any trench. The depth of the trenches, labeled Y in FIG. 5a, is preferably between approximately one half and approximately three exterior aperture diameters, and more preferably between approximately one and approximately two exterior aperture diameters. Although Y is depicted as the trench depth of a pressure side trench it should be understood that Y may represent the depth of any trench. Notably, trench depths of an airfoil need not be uniform.

As depicted in greater detail in FIG. 5b, the cross-sectional geometry of a trench may be additionally defined by an edge (e.g., edge 280) between the sides of the trench (e.g., side 284) and the exterior surface of the airfoil and an edge (e.g., edge 282) between the sides of the trench and the bottom of the trench. Corners (e.g., corners 280 and 282) each have a radius preferably between approximately zero exterior aperture diameters (a square edge) and three exterior aperture diameters, and more preferably between zero exterior aperture diameters and one exterior aperture diameter.

Additionally, in other embodiments, a trench may be further defined by the angle (σ) between the trench sidewalls (e.g. sidewalls 284 and 286). The angle between the sidewalls is preferably between 0 degrees (parallel sidewalls) and 90 degrees, and more preferably between 0 degrees and 20 degrees.

In some embodiments the trench geometry is uniform along the span length of the trench, in still other embodiments, the trench geometry may vary along the span length of the trench.

Figure 6:
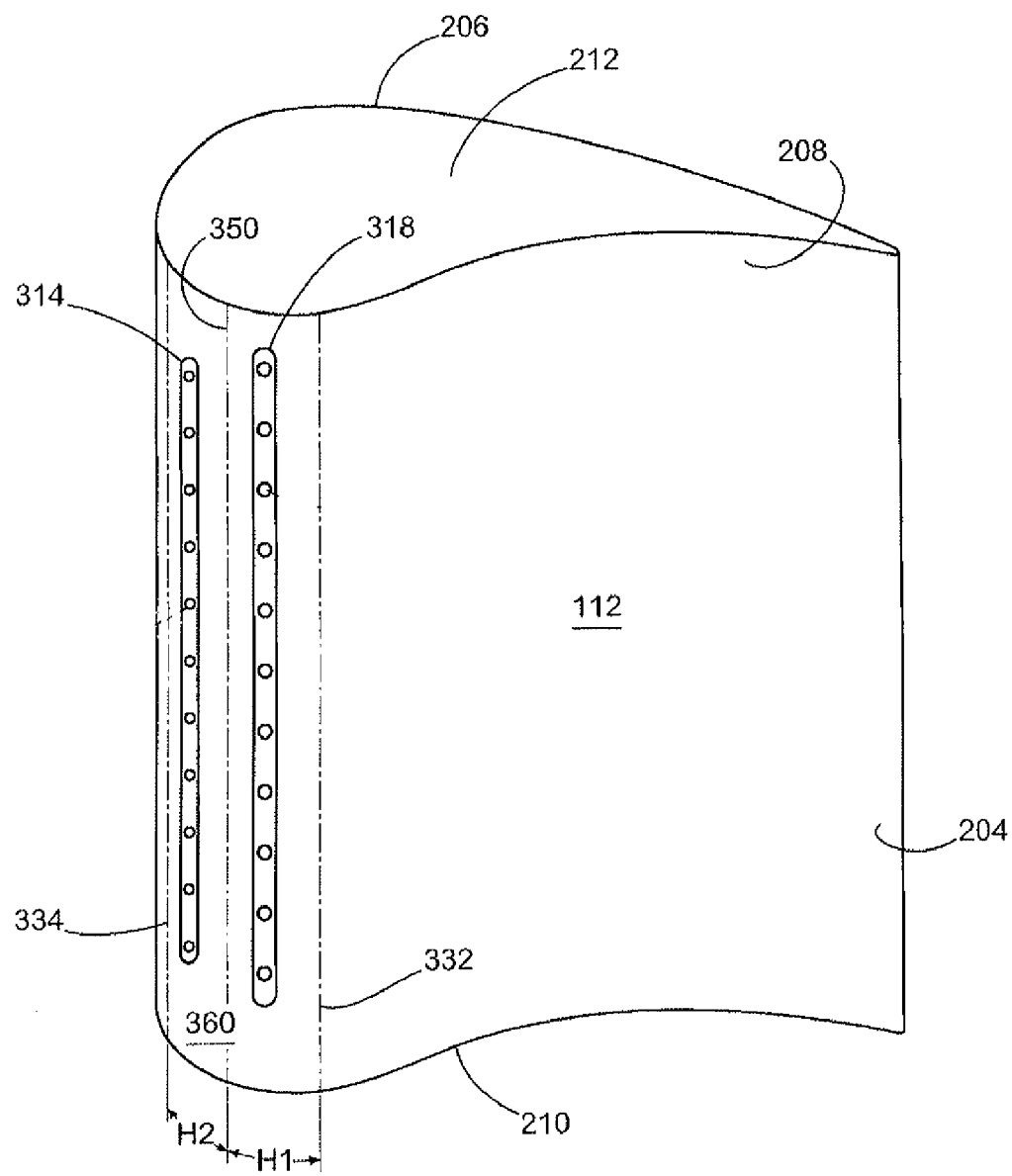
FIG. 6 is a perspective view depicting a representative turbine blade from the embodiment of FIG. 1.

FIG. 6 depicts an airfoil with two trenches. Specifically, trenches 314 and 318 have centerlines located in a stagnation region 360. A "stagnation region" represents the chordwise extent of the stagnation lines of an airfoil, with the chordwise extent being bounded by a pressure side boundary and a suction side boundary. In this case, a pressure side boundary 332 and a suction side boundary 334. These boundaries are displaced from the stagnation line 350 a distance of H1 along the pressure side and a distance of H2 along the suction side, respectively. Although FIG. 6 depicts two trenches located within a stagnation region, in other embodiments, more than two trenches may be located in a stagnation region.

It should be noted that the positioning of trenches on an airfoil can vary depending on the configuration of the airfoil. By way of example, when the airfoil is a first stage vane and at least two trenches are positioned within the stagnation region (such as shown in FIG. 6), the trenches can be spaced from the stagnation line of the vane by as much as approximately 15 exit aperture diameters. That is, a first stage vane may have a relatively broad leading edge that exhibits a stagnation region that is wider than the stagnation region of other vanes of other stages. Thus, on a first stage vane, distances H1 and H2 (which correspond to the distances between stagnation line 350 and boundaries 332 and 334, respectively) may be as much as approximately fifteen exit aperture diameters.

In other embodiments, such as those involving airfoils other than first stage vanes, the airfoils may incorporate narrower leading edges. These narrower leading edges may provide for a more narrow stagnation region, which can result in closer spacing of the trenches. By way of example, the trenches can be spaced as much as approximately six exit aperture diameters from the stagnation line.

Notably, in the embodiment of FIG. 6, the centerline of a trench is not located along the stagnation line.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. An airfoil comprising:
an exterior surface defining a leading edge, a trailing edge, a suction side and a pressure side;
an interior surface defining an interior cavity;
trenches in the exterior surface oriented spanwise along the leading edge; and
cooling holes communicating between the interior cavity and the trenches such that cooling air provided to the interior cavity flows from the interior cavity through the cooling holes into the trenches, the cooling holes having exterior apertures located in the trenches and interior apertures located at the interior surface.

2. The airfoil of claim 1, wherein:
the airfoil has a stagnation line oriented spanwise along the leading edge of the airfoil; and
a first of the trenches is a stagnation trench having two opposing spanwise edges, the stagnation line being located between the spanwise edges.

3. The airfoil of claim 2, wherein at least one of the exterior apertures is located in the stagnation trench.

4. The airfoil of claim 2, wherein:
a second of the trenches is a pressure trench displaced from the stagnation trench towards the pressure side of the airfoil; and
at least one of the exterior apertures is located in the pressure trench.

5. The airfoil of claim 2, wherein:
a second of the trenches is a suction trench displaced from the stagnation trench towards the suction side of the airfoil; and
at least one of the exterior apertures is located in the suction side trench.

6. The airfoil of claim 1, wherein:
a first of the exterior apertures has a center;
a first of the trenches has a centerline; and
the center of the first of the exterior apertures is aligned with the centerline of the first of the trenches.

7. The airfoil of claim 1, wherein the exterior apertures located in a first of the trenches are offset, with respect to chordwise alignment, from the exterior apertures located in a second of the trenches.

8. The airfoil of claim 1, wherein;
a first of the cooling holes has a first section and a second section, the first section being cylindrical in shape, the second section being conical in shape; and
a first end of the first section defines the interior aperture and a first end of the second section defines the exterior aperture.

9. The airfoil of claim 1, wherein;
the exterior apertures have a defined diameter; and
a first of the trenches has two opposing spanwise edges, the edges being spaced from each other by between approximately one exterior aperture diameter and approximately three exterior aperture diameters.

10. The airfoil of claim 1, wherein:
the airfoil has a span length;
a first trench has a span length; and
the span length of the first trench is between approximately 50% and 100% of the span length of the airfoil.

11. The airfoil of claim 10, wherein:
the exterior apertures have a defined diameter;
a first of the trenches has a first spanwise edge;
a second of the trenches has a second spanwise edge located adjacent to the first spanwise edge; and
the first spanwise edge and the second spanwise edge are separated by between approximately one exterior aperture diameter and approximately three exterior aperture diameters.

12. The airfoil of claim 10, wherein:
the airfoil has a stagnation line oriented spanwise along the leading edge of the airfoil;
a first of the trenches is a stagnation trench positioned along the stagnation line;
a second of the trenches is a pressure trench displaced from the stagnation trench towards the pressure side of the airfoil; and
a third of the trenches is a suction trench displaced from the stagnation trench towards the suction side of the airfoil.

13. The airfoil of claim 12, wherein the first of the trenches has a span length of at least approximately 50% of a span length of the airfoil.

14. The airfoil of claim 1, wherein the airfoil is a turbine blade.

15. The airfoil of claim 1, wherein at least a portion of each of at least two of the trenches are located in a stagnation region.

16. The airfoil of claim 1, wherein the cross-sectional geometry of trenches is substantially uniform along respective lengths of the trenches.

17. The airfoil of claim 1, wherein at least some of the exterior apertures are circular.

18. A turbine assembly for a gas turbine engine comprising:
multiple airfoils, a first of the airfoils having an exterior surface, an interior cavity, trenches and cooling holes;
the exterior surface defining a leading edge, a trailing edge, a suction side and a pressure side;
the trenches being located in the exterior surface and oriented along the leading edge;
the cooling holes communicating between the interior cavity and the trenches such that cooling air provided to the interior cavity flows from the interior cavity through the cooling holes into the trenches, the cooling holes having exterior apertures located in the trenches.

19. The assembly of claim 18, wherein the airfoils are turbine blades.

20. A gas turbine engine comprising:
a compressor section;
a combustion section; and
a turbine section;
the turbine section having multiple airfoils, a first of the airfoils having an exterior surface, an interior cavity, trenches and cooling holes;
the exterior surface defining a leading edge, a trailing edge, a suction side and a pressure side;
the trenches being located in the exterior surface and oriented along the leading edge;
the cooling holes communicating between the interior cavity and the trenches such that cooling air provided to the interior cavity flows from the interior cavity through the cooling holes into the trenches, the cooling holes having exterior apertures located in the trenches.

* * * * *